United States Patent [19]
Milner

[11] Patent Number: 5,594,593
[45] Date of Patent: Jan. 14, 1997

[54] REAR VIEW SYSTEM FOR A VEHICLE

[76] Inventor: Peter J. Milner, 8 Juliet Close, Nuneaton, Warwickshire, England, CV116NS

[21] Appl. No.: 121,905

[22] Filed: Sep. 16, 1993

Related U.S. Application Data

[63] Continuation-in-part of Ser. No. 833,824, Feb. 11, 1992, abandoned, which is a continuation of Ser. No. 555,413, Aug. 10, 1990, abandoned.

[30] Foreign Application Priority Data

Dec. 17, 1988 [GB] England .................... 8829501

[51] Int. Cl.$^6$ .................... G02B 17/00; G02B 5/04; G02B 5/08; B60R 1/08
[52] U.S. Cl. .................... 359/726; 359/742; 359/837; 359/838; 359/872; 359/669; 359/503
[58] Field of Search .................... 359/831, 833, 359/837, 838, 871, 872, 509, 514, 669, 742, 726, 503, 737, 728

[56] References Cited

U.S. PATENT DOCUMENTS

| | | |
|---|---|---|
| 3,794,411 | 2/1974 | Gray . |
| 3,809,462 | 5/1974 | Baumgardner et al. . |
| 3,826,562 | 7/1974 | Baumgardner et al. . |
| 3,979,158 | 9/1976 | Yamashita et al. . |
| 4,274,714 | 6/1981 | Okamura . |

FOREIGN PATENT DOCUMENTS

| | | |
|---|---|---|
| 2240618 | 3/1975 | France . |
| 8804109.3 | 6/1988 | Germany .................... 359/837 |
| 1405188 | 9/1975 | United Kingdom . |

*Primary Examiner*—Ricky D. Shafer
*Attorney, Agent, or Firm*—Morrison Law Firm

[57] ABSTRACT

An optical rear view system for a vehicle, having a reflector mounted to receive light from objects to the rear of the vehicle and to reflect it towards an observer, is provided with at least one further optical component between the reflector and the observer effective to direct towards the observer, by refraction or reflection, a portion of the light which upon reflection at the reflector is not directed towards the observer, whereby to provide a wider field of view than that obtainable from the reflector alone. The reflector is positioned forwardly of the observer so as to be in his field of view and the surface of the system on which light from an object behind the vehicle is first incident lies at an acute angle to the longitudinal axis of the vehicle and is inclined such that a forward part of the incident surface is further from the vehicle axis than a rearward part.

67 Claims, 9 Drawing Sheets

EYES

EYES

REAR VIEW SYSTEM FOR A VEHICLE

This application is a CIP of U.S. Ser. No. 07/833,824, filed on Feb. 11, 1992, now abandoned, which is a Continuation of U.S. Ser. No. 07/555,413, filed on Aug. 10, 1990, now abandoned.

This invention generally relates to a rear view system for a vehicle, and particularly to such a system especially suitable for a road transport vehicle.

Conventional rear view systems usually comprise a single interior mirror supplemented by two exterior mirrors. At one time exterior mirrors were mounted on the vehicle wing over the front wheel but in more recent vehicles they are usually fitted on the doors at the front of the vehicle, which position represents the closest they can be brought to the driver whilst remaining forward of him. Exterior mirrors are becoming increasingly necessary as an aid to safe driving in today's traffic conditions. Dense traffic and multi-lane highways demand increasingly high standards of lane discipline and all-round awareness. The information necessary to maintain such high standards is achieved largely through the use of exterior rear view mirrors. In recognition of this evolving requirement, exterior mirrors have grown larger over recent years. So vital is the need for comprehensive visual information that this growth has even taken place against a background of intense efforts to reduce air drag. Conventional exterior mirrors, however, have been estimated to be responsible for the consumption of up to 1000 liters of fuel during the life of a car.

Apart from this cost, exterior mirrors generate aerodynamic noise, are vulnerable to damage, can cause injury and, finally, look aesthetically displeasing on the smooth and rounded exterior surfaces which characterise modern car design.

In recent years increasing emphasis has been placed on efficient use of non-renewable energy resources. Nowhere has this emphasis been more keenly applied than in the development of road transport vehicles. Although great progress has been made in the energy efficiency of engines and in reducing wastage of the mechanical energy thus generated primarily by improvements in vehicle weight reduction, tire rolling loss reduction and vehicle aerodynamic drag reduction, there is one factor which still presents considerable problems. During medium and high speed cruising, the aerodynamic drag factor, which is the factor having the greatest effect at higher speeds (where aerodynamic drag may account for up to 80% of the total mechanical energy loss) results in both drag and noise. For this reason, car manufacturers seek any practical means to reduce aerodynamic drag, but they also have many other requirements to fulfil in order to preserve the car as a convenient, comfortable and safe machine to use. As more and more exterior aerodynamic features become increasingly refined, the degrading effects of those which have largely resisted improvement are highlighted. The exterior mirror is one of these features. Furthermore, sited as they usually are in an area where the air speed can be somewhat greater than free stream speed, their degrading effect is magnified.

Furthermore, although they are designed to yield under impact, exterior mirrors remain a traffic hazard. Mirror yield is of most benefit in very low speed impacts. In higher speed impacts, whether against another mirror or a pedestrian, mirror inertia plays an important role and considerable damage and/or injury can occur.

The present invention seeks to provide a rear view system for a vehicle with substantially reduced protrusion beyond the exterior surface of the vehicle, as compared with existing exterior rear view mirrors, while retaining or improving the rearward and lateral fields of view.

The present invention also seeks to provide a rear view system offering less resistance to vehicle motion and lower aerodynamic noise than conventional exterior mirrors whilst also being less of a hazard to other road users.

According to one aspect of the invention, there is provided an optical rear view system for a motor vehicle, said system comprising housing means for a viewing system of optical components, comprising reflector means;

first refractor means between an object to the rear of said vehicle and said reflector means, said first refractor means having an incident face on which light from said object is incident and an exit face from which light passing through said first refractor means is directed towards said reflector means, said first refractor means being shaped and positioned such that the optical path length of light within said first refractor means is shorter than the optical path length of light from said exit face to said reflector means within said housing, and second refractor means between said reflector means and an observer, said second refractor means having an incident face on which light from said reflector means is incident and an exit face from which light passing through said refractor means is directed towards the observer.

As will be appreciated, the rear view system of the invention is composed of passive optical elements, which present to the driver, optically and physically, largely the same view as that conventionally expected of a vehicle exterior mirror, while at the same time protruding beyond the local exterior surface of the vehicle by substantially less than the amount of an optically comparable conventional mirror, and is distinguished in this respect from rear view systems involving television cameras or other "video" arrangements which present the image of the rearward view on a screen.

As used in this specification the term "observer" will be understood to mean the eye or eyes of an observer.

Other features and advantages of the invention will become more apparent from the following detailed description in which reference is made to the accompanying drawings, provided purely by way of non-limitative example.

Figure 1:
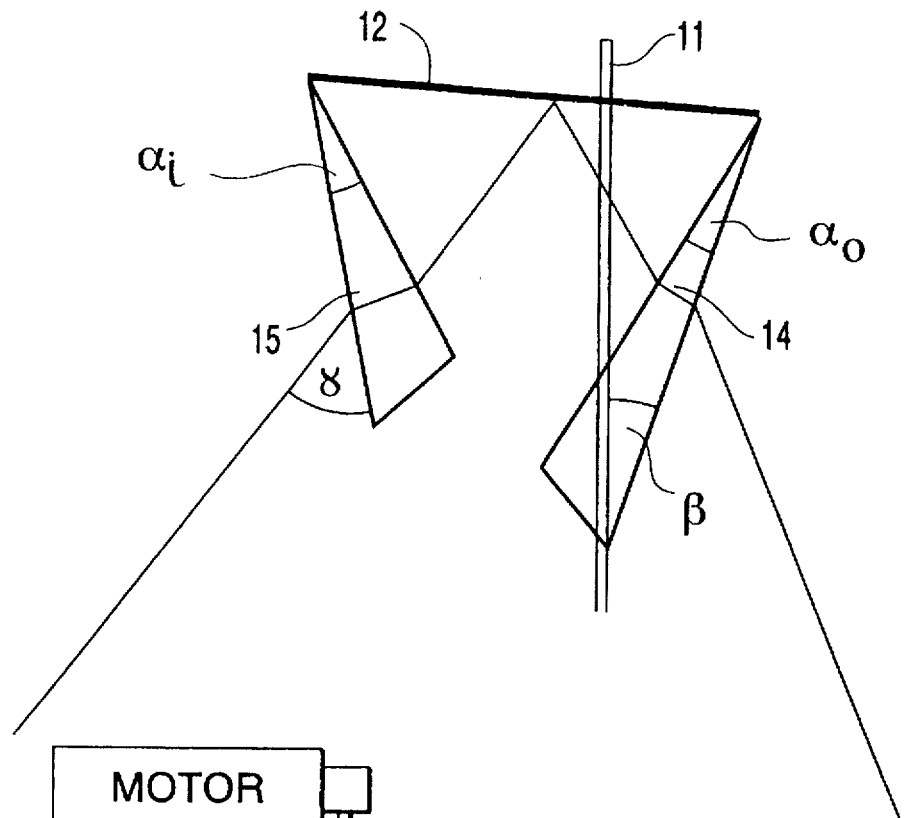
FIG. 1 is a diagram illustrating a first practical embodiment of the embodiment of the invention.
Figure 2:
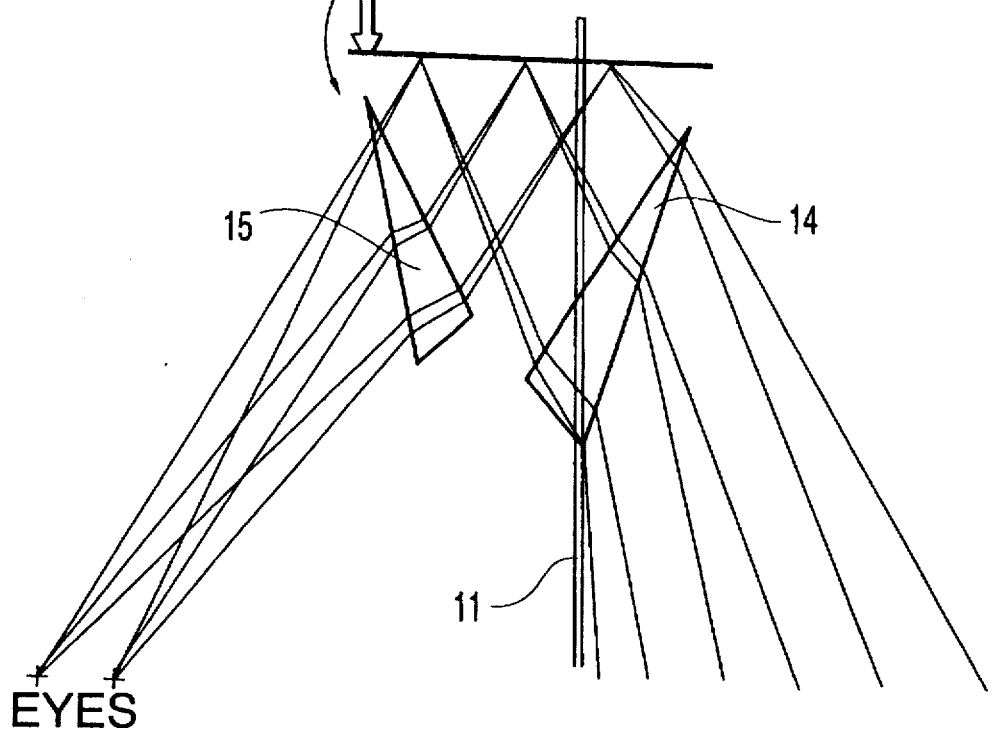
FIG. 2 is a ray diagram which illustrates the optical behaviour of the embodiment shown in FIG. 1.
Figure 3:
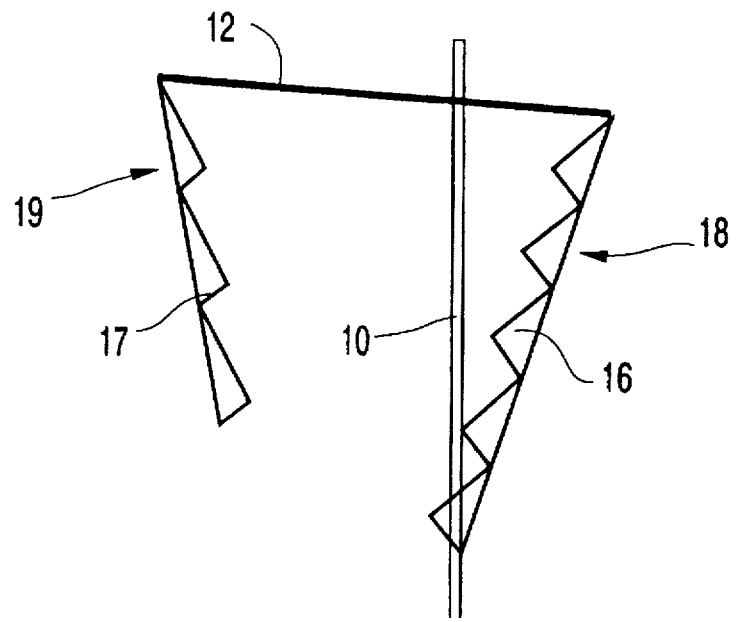
FIG. 3 is a diagram schematically illustrating another embodiment of the invention, but incorporating Fresnel prisms.
Figure 4:
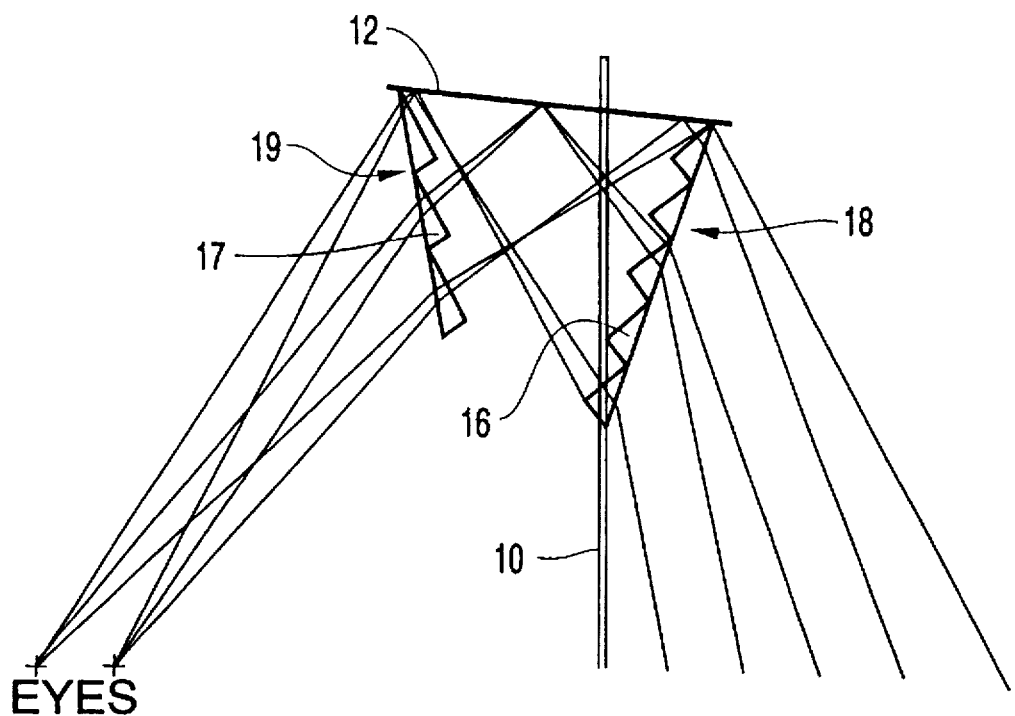
FIG. 4 is a ray diagram which illustrates the optical behaviour of the embodiment shown in FIG. 3.
Figure 5:
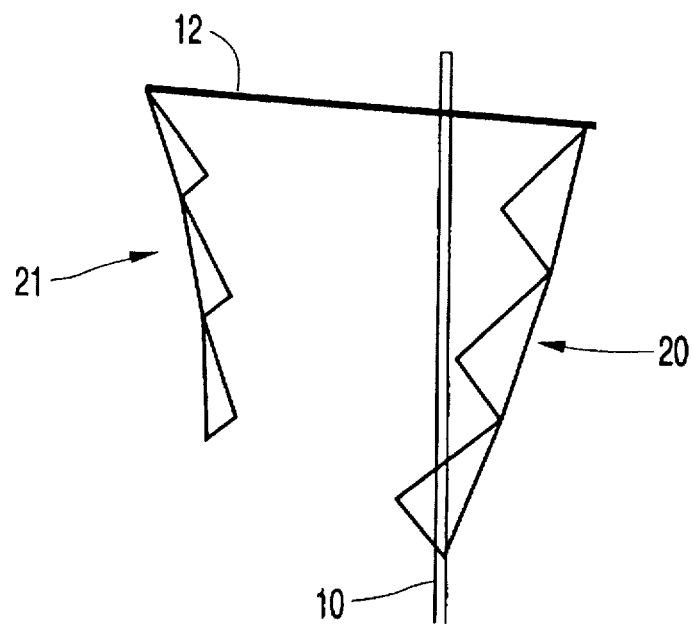
Figure 6:
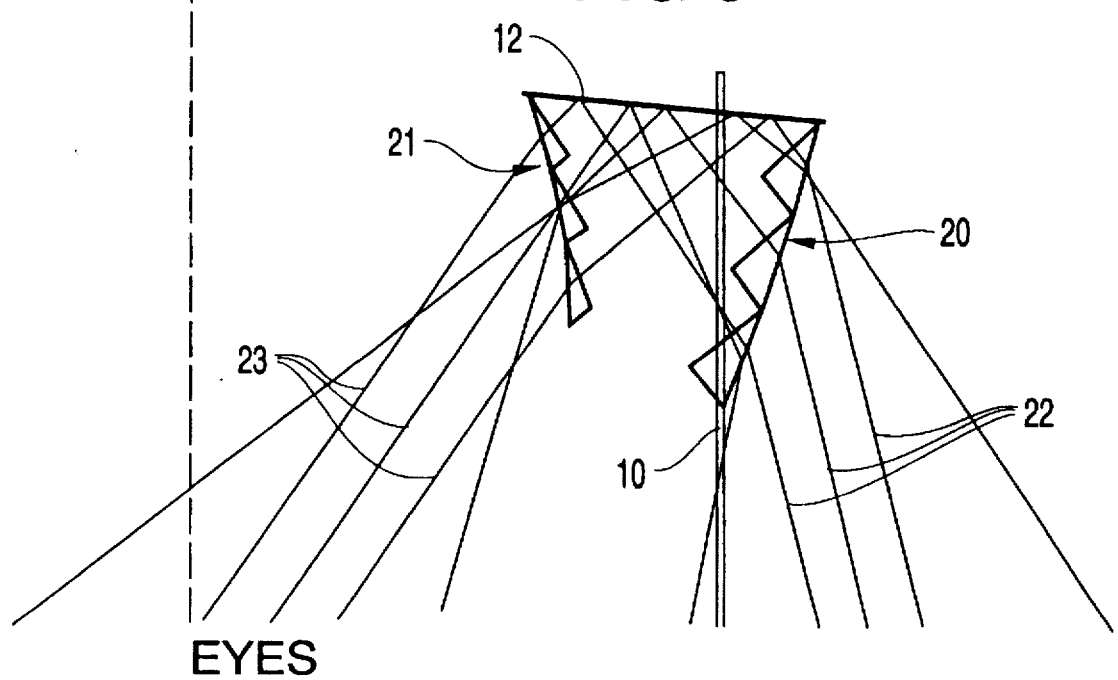
Figure 7:
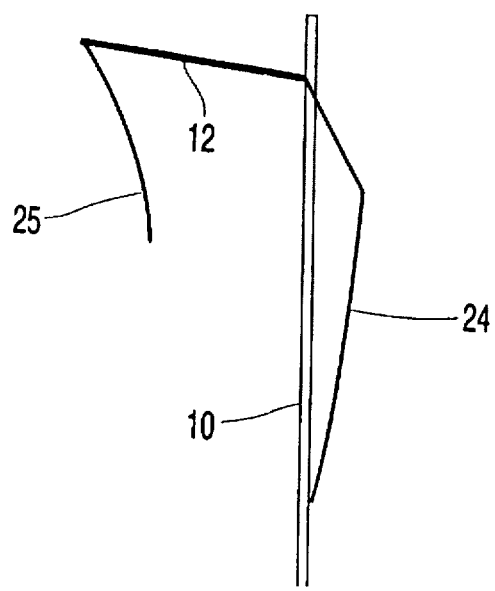
Figure 8:
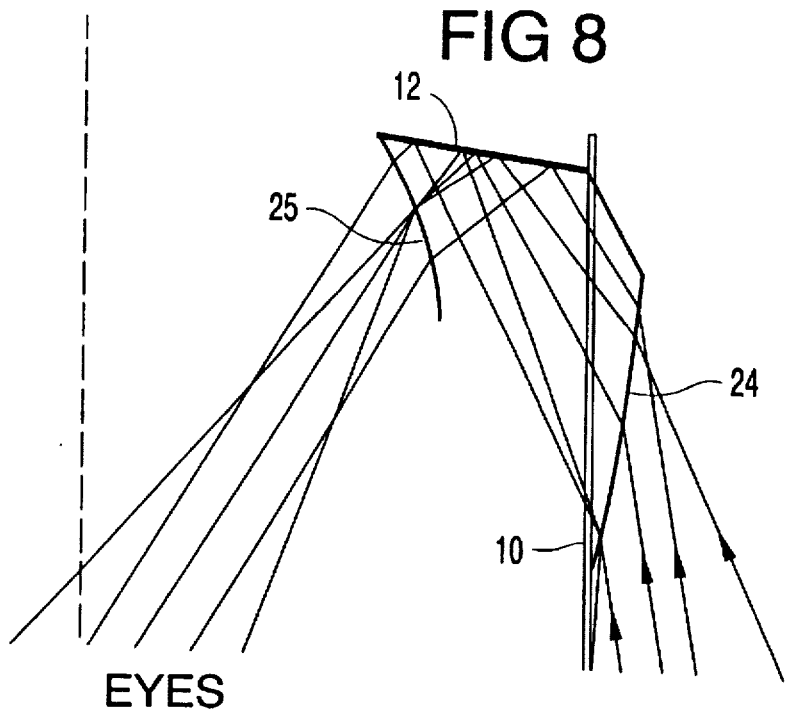
Figure 9:
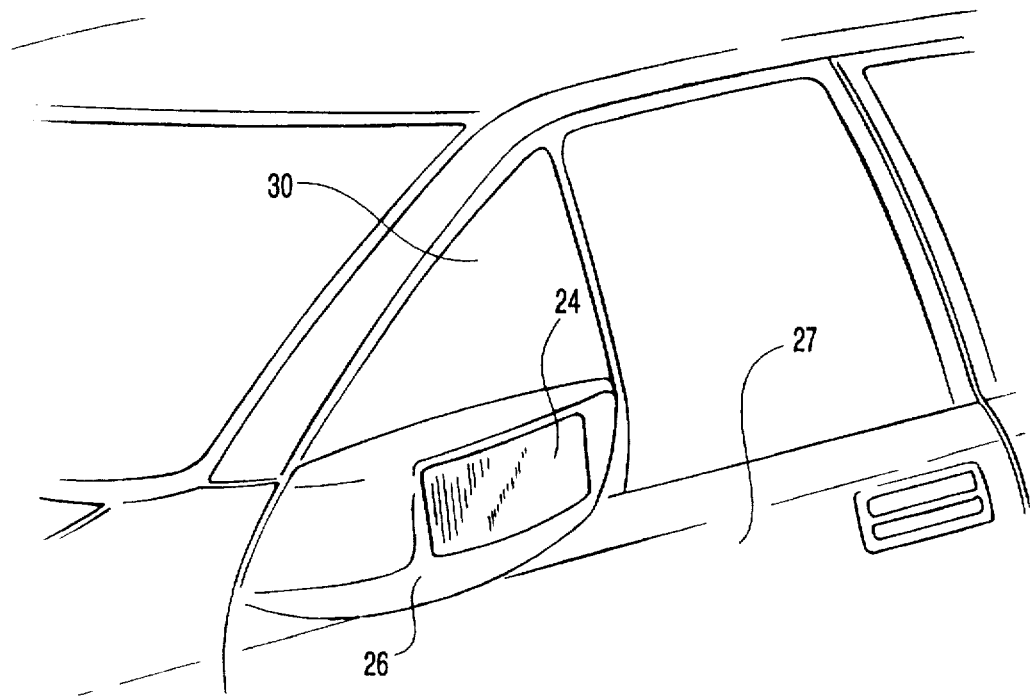
Figure 10:
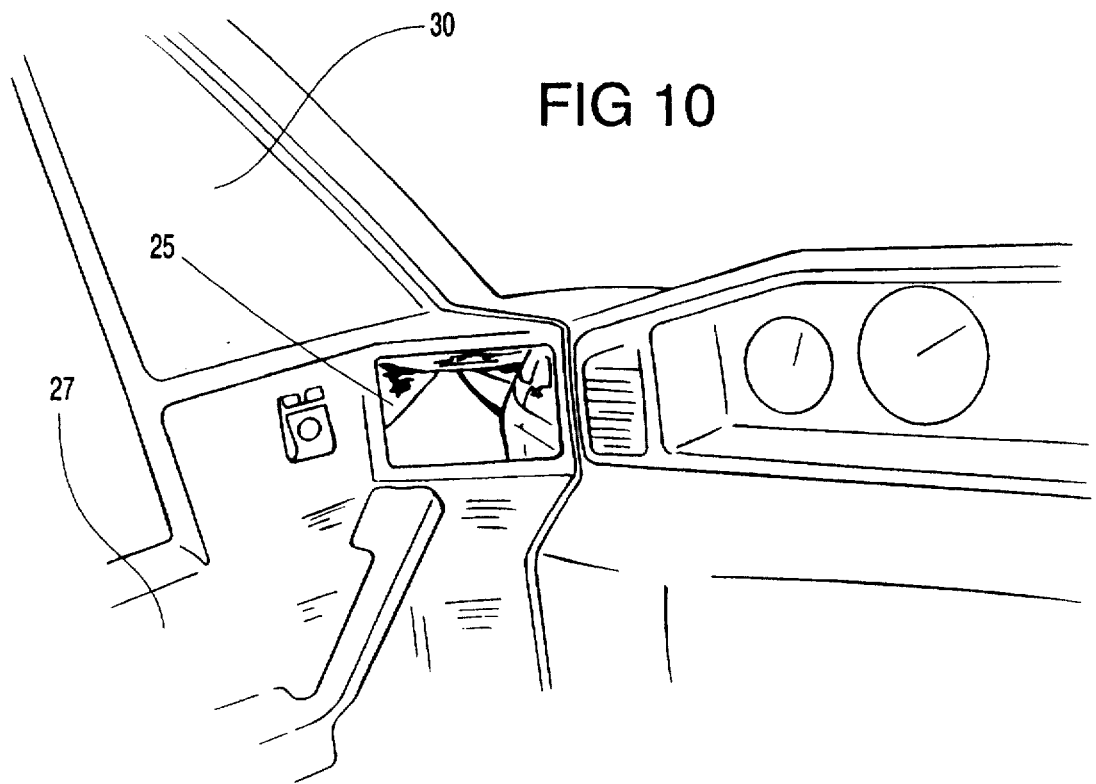
Figure 11:
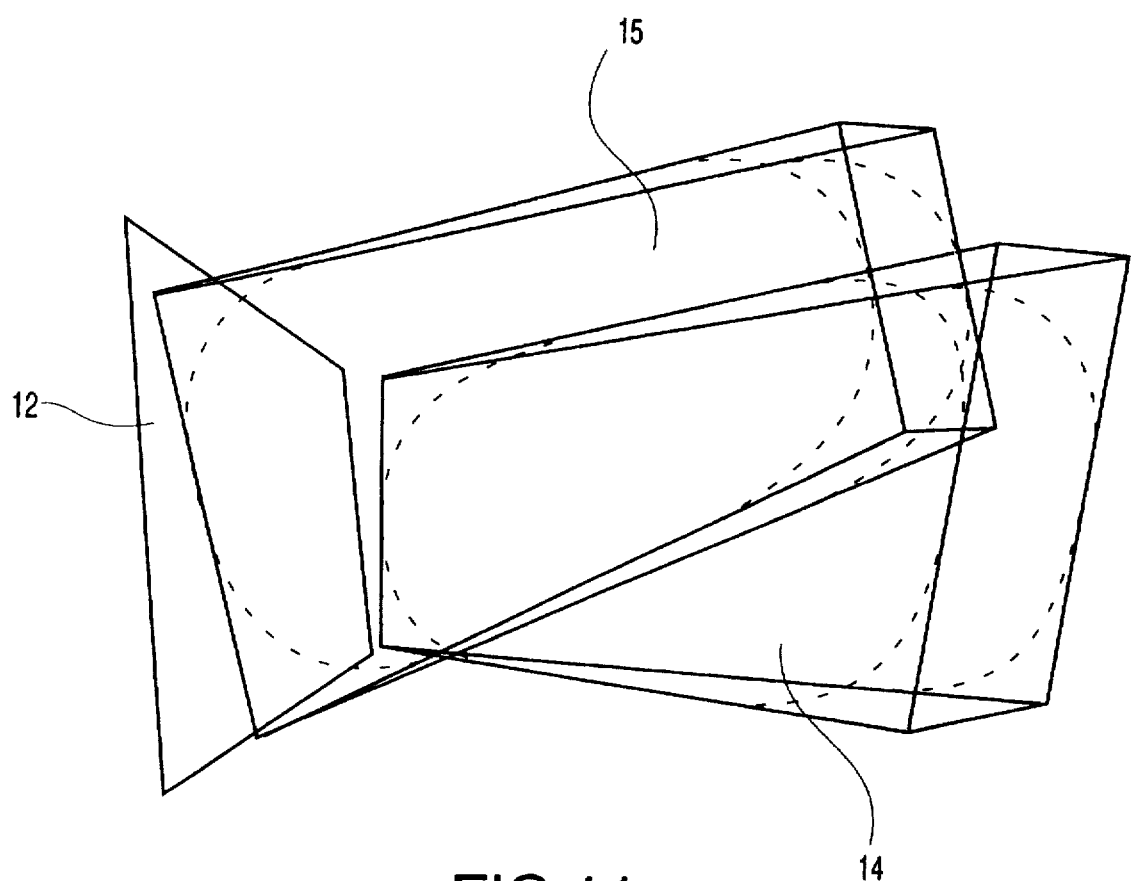
Figure 11A:
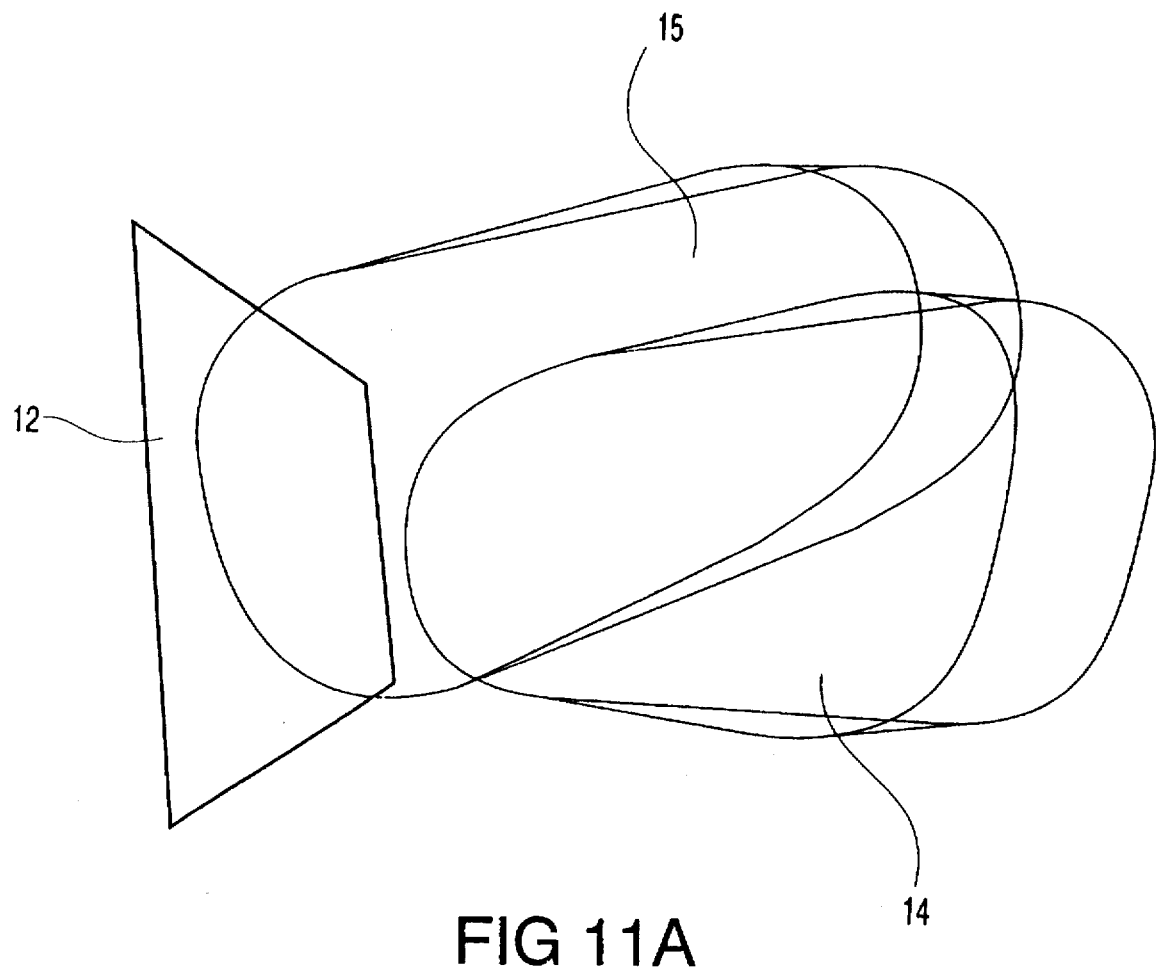
Figure 12:
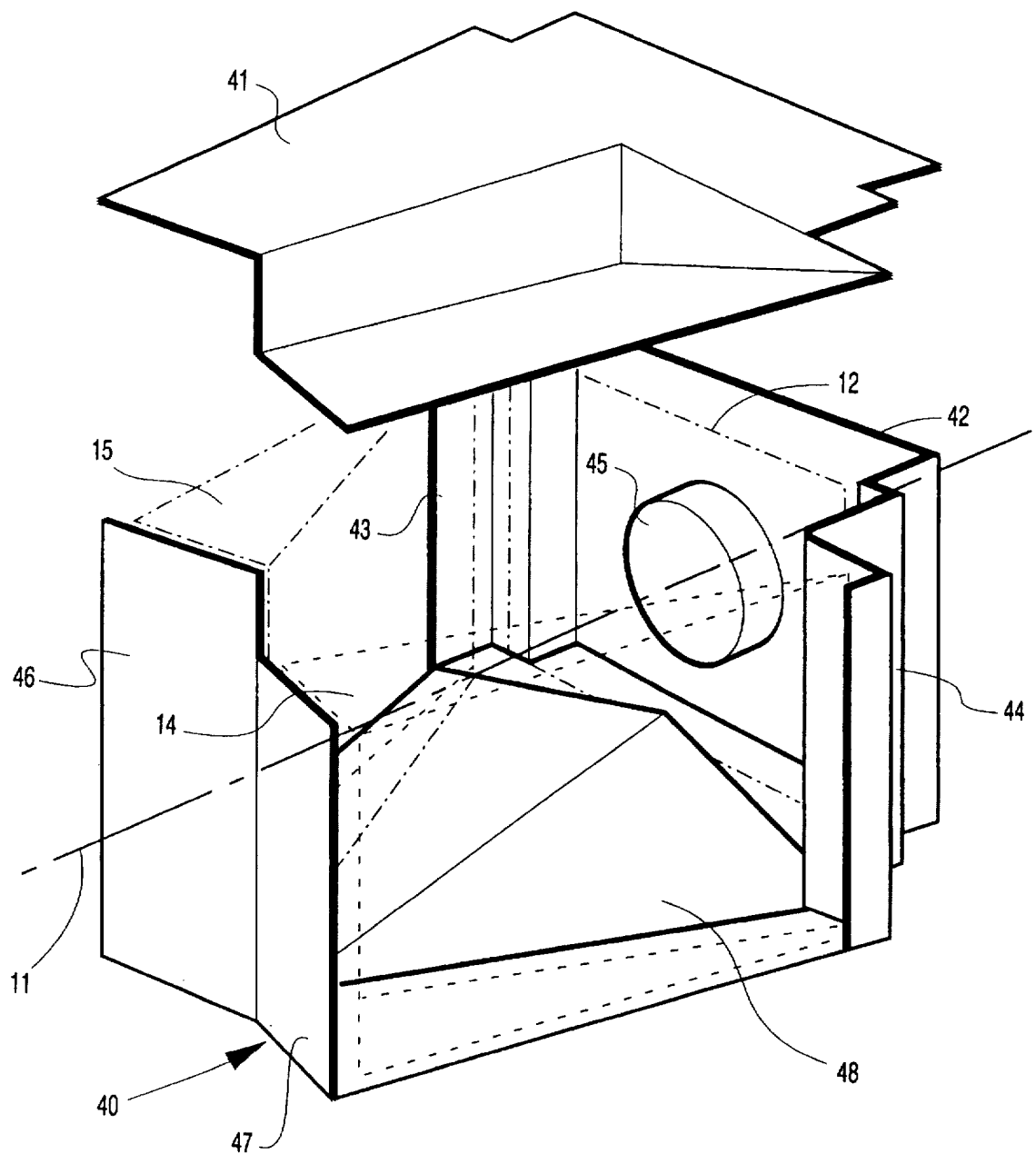
Figure 13:
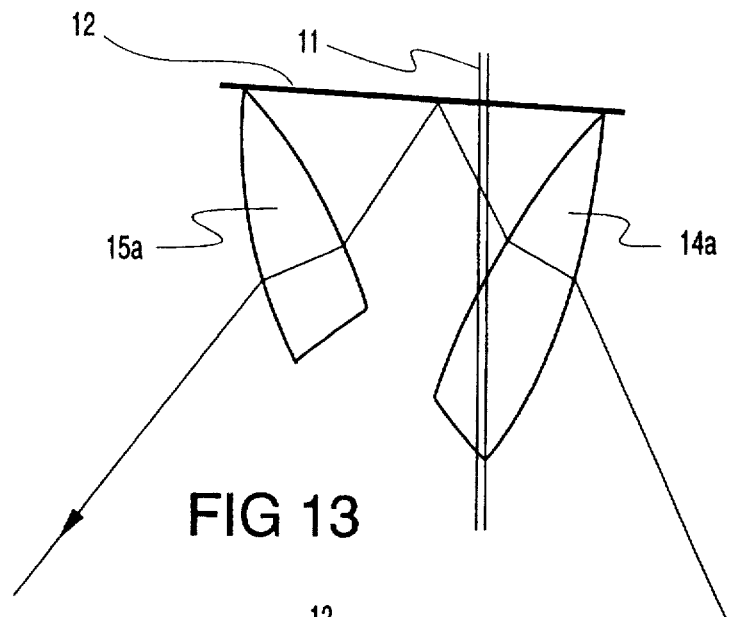
Figure 14:
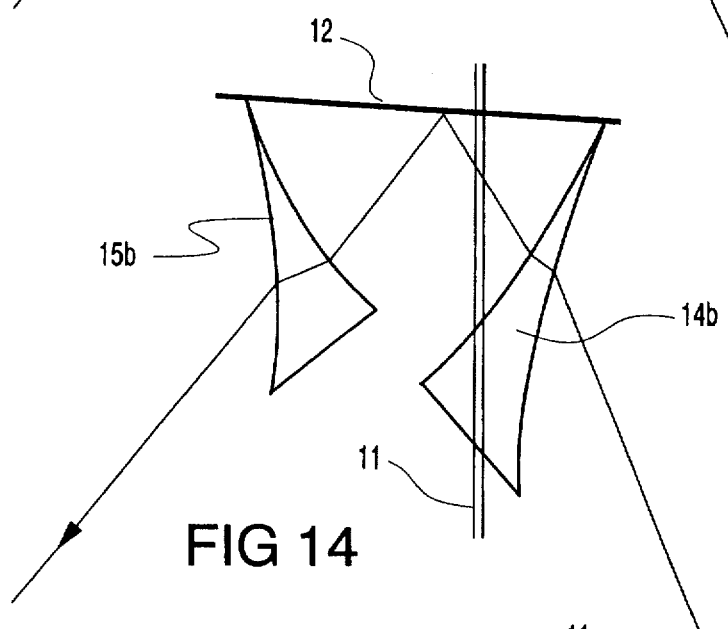
Figure 15:
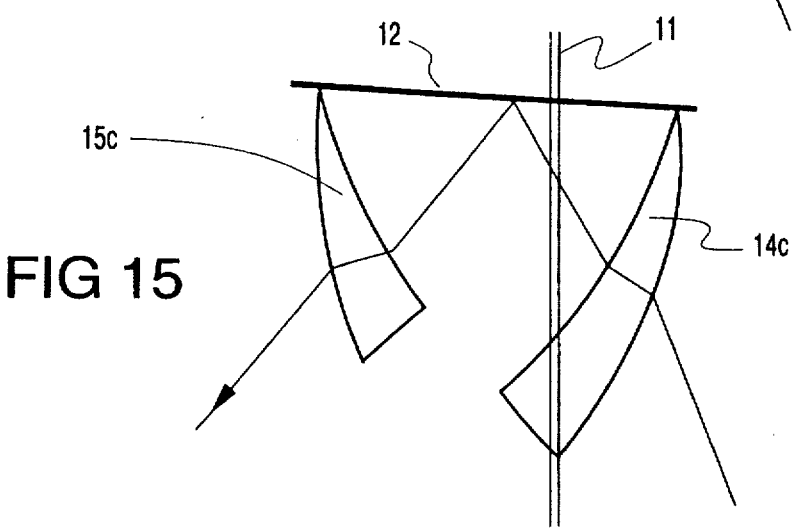

FIG. 5 schematically illustrates an embodiment similar to that of FIG. 3, but incorporating non-planar optical elements;

FIG. 6 is a ray diagram which illustrates the optical behaviour of the embodiment shown in FIG. 5;

FIG. 7 is a schematic diagram of a further embodiment of the invention, in which the parts outside the vehicle may be physically separate from those inside;

FIG. 8 is a ray diagram which illustrates the optical behaviour of the arrangement shown in FIG. 7;

FIG. 9 is a diagrammatic view illustrating in perspective a further embodiment of the invention seen from the outside of a vehicle;

FIG. 10 is a perspective view from inside the vehicle of the embodiment of FIG. 9;

FIG. 11A is a perspective view of the optical components of the embodiment of FIGS. 1 and 2 in which the prisms have rounded corners;

FIG. 12 is a perspective view of a housing for the optical components illustrated in FIG. 11; and FIGS. 13 to 15 are schematic views of the optical components of various different alternative embodiments.

Referring first to FIG. 1, the optical components of an embodiment of the invention are shown in schematic form in plan view from above.

The line 11 in the drawings identifies the line of a motor vehicle body and serves to identify the location of the rear view system of the invention with respect to the vehicle exterior; it may but does not necessarily, coincide with a window of the vehicle. The three principal components of the optical system, each of which will be described in more detail below are a reflector 12, an objective prism 14 in the path of light from an object to the rear of a vehicle and the reflector, and an occular prism 15 in the path of light from the reflector to the observer, namely the vehicle driver.

To understand the function of the mirror assembly as described, it is necessary to appreciate that, for distant objects, it is only the ray angle which matters, not its position in space.

It will be appreciated that the two prisms 14, 15 and reflector 12 will be housed in a suitable housing, one form of which will be described in more detail below in relation to FIGS. 9 and 10, and a description of which is given in relation to FIG. 12 which may be adapted to be fitted to a vehicle door, or may be constituted by a vehicle door or a part of a vehicle door in embodiments of the invention made as original equipment. Retrofit embodiments of the invention may, however, be made to be mounted on a side window and to be observed through the window. Certain advantages of the invention can best be achieved, however, by incorporating the rear view system of the invention in the vehicle design. In particular, if, as shown in the embodiments of FIGS. 1 and 2, the optical system spans the body line so that only the outer surface of an objective refractor lies outside the body line, this minimises the projection of the rear view system laterally of the vehicle, and, at the same time, brings the image position inboard so that the observer does not have to divert his line of sight so far from the straight-ahead position in order to view the image presented by the rear view mirror as is currently the case with conventional external door-mounted rear view mirrors.

The invention is directed to providing a low-profile rear view mirror in which the image quality is maintained at a high level. It is known that, for many applications, the primary function of a prism is to effect dispersion, that is separation of the incident light into its different colour components. This, of course, would cause degradation of the image in a rear view mirror and the design parameters considered in achieving the rear view system of the present invention make it possible for prisms, whether formed as traditional triangular prisms as shown in FIGS. 1 and 2, or formed as Fresnel refractors or prisms as will be described in relation to later embodiments, to be used to direct the light without causing significant dispersion of the light passing through them. Another important consideration is the field of view achieved through the optical system, and much design effort has been expended in arriving at a rear view system in which a wide field of view can be obtained despite the relatively small lateral projection of the reflector beyond the body line of the vehicle.

In the following description it will be assumed that the body line represented by the lines 11 in FIGS. 1 and 2 is substantially parallel to the longitudinal axis of the vehicle. Although the precise body line may lie at a small angle to the absolute central longitudinal axis the divergence from this axis is small in relation to the considerations set out below, and for all practical purposes the body line may be taken to be parallel to the longitudinal axis.

Earlier attempts to provide low profile mirrors using refractors have concentrated on the use of solid prisms in which the path length of the light within the prism is relatively great in that it lies within the prism entirely from the point where it enters the optical system to the point where it leaves the optical system. By utilising two separate prisms 14, 15, however, the path length of light through the refractive material of the prisms can be minimised, whilst nevertheless directing the light to the driver's eyes. Not only this, but choices which are available only as a result of having two prisms can be made with a view to achieving a good image quality. For example, chromatic aberration can be kept low without introducing significant image distortion by suitable selection of prism angles α and by choosing material having appropriate refractive indices for different colours of light or, more accurately, having an appropriate Abbè value. The Abbè value is the reciprocal of the dispersive power of a medium and is calculated as a relationship between the specific refractive indices of the material for different wavelengths. The Abbè value V is given by the following equation:

$$V = \frac{N_D - 1}{N_F - N_C}$$

where $N_D$ is the reflective index of the material for light of the wavelength of the sodium D line $N_F$ is the refractive index of the material for light at the wavelength of the hydrogen F line $N_C$ is the refractive index of the material for light at the wavelength of the hydrogen C line.

In FIG. 1 the apex angle of the objective prism 14 has been indicated $α_0$ and the apex angle of the occular prism 15 has been indicated $α_i$. In order to minimise chromatic aberration of the overall optical system it has been established by the inventor that the ratio between the occular prism angle $α_i$ and the Abbè value for the material of the occular prism 15 must lie within 0.4° of the equivalent value for the objective prism 14. It will be noted that the Abbe value is dimensionless so that the units of this relationship are degrees. The choices of the materials for the objective and occular prisms therefore effectively determines the relationship between the prism angles and, conversely, if the prism angles are of primary concern, these may be set within a given range and the condition satisfied by appropriate choice of material.

The embodiment shown in FIG. 1 comprises an arrangement using discrete prisms 14, 15 and a separate reflector 12. FIG. 2 is a ray diagram showing the paths of light rays through the system. By adopting different materials for the two prisms, in this case acrylic for prism 14 and acrylic/stirene copolymer for prism 15, dispersion may be effectively eliminated or at least reduced to an insignificant level.

The angles of all four refracting surfaces, and the reflecting surface, as well as the optical properties of the prisms, are variables by which field of view linearity, image size and dispersion may be developed to produce a desired, or acceptable optical performance. For example, all three aberrations are eliminated in a symmetrical design in which the prisms have equal apex angles, are in the same material, and form equal angles with the mirror. Unfortunately, in such a design with low protrusion the exit rays cannot readily be made to emerge towards the driver's eyes and low protrusion is an important objective. However, by inserting one or more contact deviation achromatic prisms (not shown) in the light path from mirror assembly to eye this may be rectified. Alternatively, in some instances it may be possible to divert the light path by dual reflection from two additional mirrors (again not shown).

In some applications, for example passenger side mirrors, a diminished image may be desirable in order to widen the field of view. In this context it should be noted that the diminished image obtained by the optical system described is formed at the same distance as the object. This is preferred to the conventional convex mirror used to diminish the image for which greater eye accommodation is needed.

It has been established that, in order to obtain a usefully wide field of view with an acceptable image size, the limiting condition is that the angle of inclination of the incident surface of the objective prism 14, which angle has been indicated β in FIG. 1, must be less than the smallest angle between the emerging light ray from the exit face of the occular prism 15, which has been marked γ in FIG. 1. This can be expressed in reverse, given that the range of fore and aft positions of the driver's head, determined by the range of seat adjustment, in relation to the position of the rear view system on the vehicle, largely determines the minimum angle γ, (this also being determined by the inclination of the occular prism 15 to the longitudinal axis of the vehicle) the maximum inclination of the incident surface of the objective prism 14 can be determined. It has been found that, in a practical embodiment, the maximum value of the angle β is preferably in the region of 30°. This is also consistent with the achievement of a low profile rear view system since a surface of this angle can readily be incorporated in a streamlined cowling or casing.

It has also been established that, in the case of solid prisms, for the purpose of minimising weight whilst nevertheless achieving satisfactory optical properties, the apex angle $\alpha_0$ of the objective prism 14 should be less than the inclination β of the incident surface of the objective prism to the longitudinal axis of the vehicle.

For many optical reasons, as well as reasons of weight, it would be preferable to utilise a plastics material rather than glass. Practically, however, solid prisms of plastics material present certain problems. These may be largely overcome, however, by making use of Fresnel prisms. Indeed, for reasons of packaging, weight and cost, practical designs incorporating Fresnel prisms are in fact preferred over glass. FIGS. 7 and 8 illustrate such a design, and its ray diagram, respectively. Preferably, the Fresnel mini-elements 16, 17 are formed only on the inside of each of two prisms 18, 19 as shown. The figures show the prismatic elements 16, 17 on a larger scale than would normally be used in practice, for the sake of clarity.

Other possible advantages of the Fresnel type of design include reduced interference with window design and much reduced dispersion, although the discontinuities between individual prismatic mini-elements 16, 17 may constitute an optical disadvantage unless the image produced by each element can be appropriately overlapped. For distant objects, which are what is of interest in a motor vehicle rear view mirror, there is a wide choice of dispersive powers, primarily due to the types of materials from which Fresnel prisms can be made.

All of the foregoing examples of the prismatic type of design have used planar surfaces in order to keep the image at object distance for all light passing through the system. The introduction of non-planar surfaces tends to destroy this property, causing the image to move in a disconcerting way when the head is moved. Nevertheless, curved surfaces can be useful to change field linearity and image magnification, and may also permit lower protrusion designs. This is especially useful when designing rear view mirrors intended to be fitted to the passenger side of the vehicle rather than the driver's side. Use may also (or alternatively) be made of a convex reflector for the passenger side. This changes the image position, but is acceptable in this position within limits.

FIGS. 5 and 6 illustrate schematically such a design and its ray diagram, respectively, using cylindrically curved Fresnel prisms 20, 21. In order to highlight the wish to keep the image at object distance, a parallel incident ray bundle 22 is shown in the FIG. 6 ray diagram, which emerges from the system still parallel as ray bundle 23, as required. In order to achieve the necessary curvature, flat Fresnel prisms of plastics or other elastic material may be flexed into shape during installation into the mirror assembly housing. FIG. 7 illustrates an embodiment in which protrusion is particularly low, and the exterior and interior parts are physically separate. Unlike the foregoing examples, this embodiment may have physically separated inner and outer parts on either side of a window, and may be considered more of a vehicle accessory than part of the door design.

This particular embodiment, for which the ray diagram is shown in FIG. 8, may be made from thin acrylic Fresnel prisms generally indicated by surfaces 24, 25, the outer one 24 of 15° prism angle and 1000 mm convex radius of curvature, and the inner one 25 of 35° prism angle and 350 mm concave radius of curvature. The reflector 12 has 3500 mm convex radius of curvature. Exterior protrusion is only 40 mm and optical aberrations are small over the practical working range of the design. Image size is diminished by about 40%.

Regarding installation of the described types of mirror assembly within the constraint of modern vehicle design and manufacture, except as mentioned for the example shown in FIG. 7, it is envisaged that the system will generally be housed in the door structure as shown in FIGS. 9 and 10. In this case it is anticipated that the majority of the mirror system will be concealed within the interior of a door 27, and that the parts of the system which protrude into the vehicle interior will be concealed by appropriate design of the area surrounding the viewing aperture, and a suitable outer cowling 26 (FIG. 9).

Adjustment of the system, cleaning and sealing from the outside environment may take several forms. Wherever possible the outermost optical element should form, or be enclosed by, a continuous part of the vehicle's exterior skin (such as the cowling 26), so that the remainder of the mirror system may be designed without the requirement of sealing, thereby facilitating the overall design task.

As mentioned, the body line 11 illustrated in the Figures is shown for location purposes only. In most cases it is anticipated that the door dropping glass will finish short of the mirror assembly, and that the remainder of the window aperture visibility requirement will be fulfilled by a fixed quarter light above the mirror assembly, as illustrated in FIGS. 9 and 10 by the quarter light 30.

The key features of the invention as disclosed herein are the diversion of incoming light beams by refraction and reflection without loss of image quality, particularly by chromatic abberation due to dispersion, and the displacing of light rays, exploited either separately or together by use of passive optical reflecting and/or refracting elements, to produce a vehicle exterior mirror system in which the exterior protrusion of the system is substantially less than that of an equivalent conventional mirror. Although the invention is illustrated by examples using these principles separately, combinations of the principles are not excluded. Furthermore, the invention also applies to optical systems in which the incoming light beam is broken up into more than two packets of rays which transit the mirror system independently, and which are subsequently reformed for presentation to the eyes. Included in this category are systems in which fragmentation of the light beam causes some parts of the incoming field to be lost to one eye, but which are nevertheless effective because that part of the incoming field is accessible to the other eye.

Although described hereinbefore in relation to embodiments in which the light rays are all substantially in the same plane it will nevertheless be appreciated that the changes in direction upon reflection or refraction may also be out of the common plane, allowing greater freedom in positioning the various elements of the system, especially since the rear view system is usually positioned below the eye level of the driver. Such an embodiment is shown in FIG. 11, in which it will be seen that in practical embodiment the relative inclination of the prisms is not merely in one plane as shown in FIGS. 1 to 8 for the sake of simplicity of explanation, but also in other planes to allow for a practical light path through the system. In the embodiment of FIG. 11 it will be seen that the occular prism 15 is tilted with its heel, or wider part higher than that of the corresponding part of the objective prism 14.

It will be further appreciated that any of the optical surfaces of any of the optical elements including the reflector, may be composed of substantially planar surface elements inclined to the general plane of the surface at the point where they are located.

In order to enhance the streamlined shape of the outer cowling 26 (FIG. 9) the corners of the rectangular faces of the prisms may be rounded as indicated in FIG. 11A.

FIG. 12 illustrates an example housing for receiving and locating the prisms 14, 15 and reflector 12 in the relative orientations. The housing shown in FIG. 12 comprises a cast or moulded shaped body 40 and a moulded cover 41. The body 40 has a first end wall 42 from opposite sides of which extend stepped side wall portions 43, 44. The steps in the side wall portions 43, 44 form respective rebates for receiving the reflector 12 with a space between itself and the end wall 42 which is occupied by a reflector inclination adjustment mechanism 45 shown schematically in FIG. 12. This adjustment mechanism may be of a type already known for adjustment of exterior door mirrors, and may be mechanically or electromechanically controlled. The reflector 12 is received in the rebates defined by the stepped side wall portions 43, 44 sufficiently loosely to allow adjustment of its inclination to allow adjustment of the image from side to side and up and down.

It is clear from FIG. 12 that the orientation of reflector 12 is adjustable independently of prisms 14, 15. Reflector inclination adjustment mechanism 45 preferably includes a conventional motor and linkage between the motor and reflector 12.

The stepped wall portions 43, 44 also define locations for receiving the narrow ends of the prisms 15, 14 respectively the wide ends of which are located against respective upright opposite end wall portions 46, 47. Between the opposite end walls 42 and 46, 47 is a shaped floor 48. The cover 41 is shaped in outline to fit the upper edges of the end walls 42 and 46, 47 and to define, with the edges of these walls, an exit and entrance opening to the housing 40 for light passing in through the prism 14 and out through the prism 15. All interior surfaces are painted matt black to avoid unwanted stray reflections and the shaping of the floor 48 and cover 41 is such that the housing as a whole occupies the minimum volume necessary to contain the refractors 14, 15 and reflector 12. Of course the housing 40 will in practice be located within, for example, the door or a side panel of the vehicle and secured in position and covered by the external cowling 26 illustrated in FIG. 9 on the outside and the interior trim of the vehicle on the inside.

Although plane prisms have been described in relation to the previous embodiments, prisms having curved surfaces either in one or two planes may alternatively be used. FIG. 13 illustrates an embodiment in which prisms 14A, 15A have respective convex incident and exit faces. FIG. 14 illustrates an embodiment in which prisms 14B, 15B have respective concave incident and exit faces. Finally, FIG. 15 illustrates an embodiment in which prisms 14C and 15C have both concave and convex surfaces. The prism 14C has a convex incident face and a concave exit face, whilst the prism 15C has a concave incident face and a convex exit face.

Similar considerations can be applied to embodiments utilising Fresnel refractors where the inclination of the individual elementary prism faces may vary across the width of the refractor which may be generally planar, or may be curved as described in relation to the embodiments of FIGS. 5 and 6. Such curvature may be convex or concave and either in the same or the opposite direction from the variation in inclination of the elementary prismatic facets. Whether flat or curved Fresnel prisms are employed, image quality is of importance and when using Fresnel refractors a limiting condition on image quality is that the pitch of the elementary refractor faces must ideally be less than the pupil diameter of the observer's eye. Likewise, although individual prisms have been illustrated, it is possible that compound or contact deviation prisms may be employed to achieve appropriate optical effects.

What is claimed is:

1. An optical rear view system for a motor vehicle, adapted to be mounted on the body of a vehicle so as to have a minimal lateral projection from the vehicle, said system comprising:

a) a housing having an objective opening therein exteriorly of the vehicle body, through which light from an object to the rear of said vehicle can enter said system, and a viewing opening interiorly of said vehicle body through which light can exit said system towards an observer located at the driver's position within said vehicle, b) a viewing system of optical components within said housing, said viewing system comprising
  i) reflector means for reflecting incident light thereon;
  ii) first refractor means for refracting light from said object towards said reflector means, said first refractor means being in the path of light front said object to the rear of said vehicle passing through said objective-opening towards said reflector means, said first refractor means having an incident face on which light from said object is incident and an exit face from which light passing through said first retractor means is directed towards said reflector means;
  iii) second refractor means for compensating chromatic aberrations introduced into said viewing system by said first refractor means, said second refractor means being in by path of light from said reflector means to said observer, said second refractor means having an incident face on which light from said reflector means is incident and an exit face from which light passing through said second refractor means is directed towards said observer through said viewing opening of said housing; and iv) said incident and exit faces of said first and second refractor means being substantially planar surfaces with an angle of inclination between said incident face and said exit face of said first refractor means being less than an angle of inclination between said incident face of said first refractor means and a longitudinal axis of said vehicle.

2. The optical rear view system of claim 1 wherein said first and second refractor means have rectangular faces with rounded corners.

3. The optical rear view system of claim 1 wherein said first and second refractor means inclined to one another such that a plane defined by light rays incident on and refracted by said first refractor means is inclined to a plane defined by light rays incident on and refracted by said second refractor means.

4. The optical rear view system of claim 1, wherein the orientation of said reflector means is adjustable independently of said first and second refractor means.

5. The optical rear view system of claim 1 including a motor and a linkage between said motor and said reflector means for effecting adjustment to an orientation of said reflector means.

6. The optical rear view system of claim 1, wherein said housing includes a streamlined outer casing enclosing said viewing system of optical components.

7. The optical rear view system of claim 1, wherein said housing is one of formed from and mounted within one of a motor vehicle side panel and a motor vehicle side door and includes a viewing port within a passenger compartment of said vehicle for observation of a rear view by said observer.

8. The optical rear view system of claim 1, wherein said first and second refractor means are prisms having substantially planar faces and each prism is orientated such that its apex is located adjacent said reflector means.

9. The optical rear view system of claim 1, wherein at least one of said first and second refractor means is formed as a Fresnel refractor with at least one face comprising a plurality of elementary surface portions inclined to a general plane of a surface of said at least one face.

10. The optical rear view system of claim 9, wherein said elementary surface portions are formed on said exit face of said one of said first and second refractor means.

11. The optical rear view system of claim 9, wherein said elementary surface portions are formed on said incident face of said one of said first and second refractor means.

12. The optical rear view system of claim 9, wherein said at least one thee of said Fresnel refractor is generally curved and each elementary surface portion thereof is flat and inclined at an angle with respect to a nominal plane tangential to said at least one face at a location of said respective elementary surface portion thereof.

13. The optical rear view system of claim 9, wherein said at least one face of said Fresnel refractor is substantially flat and said elementary surface portions are inclined to said general plane of said at least one face at successively greater angles across said at least one face from one side edge of said face to an other.

14. An optical rear view system for a motor vehicle, adapted to be mounted on the body of a vehicle so as to have a minimal lateral projection from the vehicle, said system comprising:

a) a housing having an objective opening therein exteriorly of the vehicle body, through which light from an object to the rear of said vehicle can enter said system, and a viewing opening interiorly of said vehicle body through which light can exit said system towards an observer located at the driver's position within said vehicle, b) a viewing system of optical components within said housing, said viewing system comprising i) reflector means for reflecting incident light thereon;

ii) first refractor means for refracting light from said object towards said reflector means, said first refractor means being in the path of light from said object to the rear of said vehicle passing through said objective-opening towards said reflector means, said first refractor means having an incident face on which light from said object is incident and an exit face from which light passing through said first refractor means is directed towards said reflector means;

iii) second refractor means for compensating for chromatic aberrations introduced into said viewing system by said first refractor means, said second refractor means being in the path of light from said reflector means to said observer, said second refractor means having an incident face on which light from said reflector means is incident and an exit face from which light passing through said second refractor means is directed towards said observer through said viewing opening of said housing: and iv) at least one face of said first refractor means comprising a plurality of elementary surface portions inclined to a general plane of a surface of said at least one face with an angle of inclination of said general plane of said first refractor means being not less than one half of an inclination of said elementary surface portions to said general plane.

15. The optical rear view system of claim 14 wherein said first and second refractor means have rectangular faces with rounded corners.

16. The optical rear view system of claim 14 wherein said first and second retractor means are inclined to one another such that a plane defined by light rays incident on and refracted by said first refractor means is inclined to a plane defined by light rays incident on and refracted by said second refractor means.

17. The optical rear view system of claim 14, wherein an orientation of said reflector means is adjustable independently of said first and second refractor means.

18. The optical rear view system of claim 14 including a motor and a linkage between said motor and said reflector means for effecting adjustment to an orientation of said reflector means.

19. The optical rear view system of claim 14, wherein said housing includes a streamlined outer casing enclosing said viewing system of optical components.

20. The optical rear view system of claim 14, wherein said housing is one of formed from and mounted within one of a motor vehicle side panel and a motor vehicle side door and includes a viewing port within a passenger compartment of said vehicle for observation of a rear view by said observer.

21. The optical rear view system of claim 14, wherein said elementary surface portions are formed on said exit face of said first refractor means.

22. The optical rear view system of claim 14, wherein said elementary surface portions are formed on said incident face of said first refractor means.

23. The optical rear view system of claim 14, wherein said at least one face of said first retractor means is generally curved and each elementary surface portion thereof is flat and inclined at an angle with respect to a nominal plane tangential to said at least one face at a location of said respective elementary surface portion thereof.

24. The optical rear view system of claim 14, wherein said at least one face of said first refractor means is substantially flat and said elementary surface portions are inclined to said general plane of said at least one face at successively greater angles across said at least one face from one side edge of said face to an other.

25. The optical rear view system of claim 14, wherein said second refractor means has at least one face thereof comprising a plurality of elementary surface portions.

26. The optical rear view system of claim 25, wherein said elementary surface portions are formed on said exit face of said second refractor means.

27. An optical rear view system for a motor vehicle, adapted to be mounted on the body of a vehicle so as to have a minimal lateral projection from the vehicle, said system comprising:
   a) a housing having an objective opening therein exteriorly of the vehicle body, through which light from an object to the rear of said vehicle can enter said system, and a viewing opening interiorly of said vehicle body through which light can exit said system towards an observer located at the driver's position within said vehicle,
   b) a viewing system of optical components within said housing, said viewing system comprising
      i) reflector means for reflecting incident light thereon;
      ii) first refractor means for refracting light from said object towards said reflector means, said first refractor means being in the path of light from said object to the rear of said vehicle passing through said objective-opening towards said reflector means, said first refractor means having an incident face on which light from said object is incident and an exit face from which light passing through said first refractor means is directed towards said reflector means;
      iii) second refractor means for compensating for chromatic aberrations introduced into said viewing system by said first refractor means, said second refractor means being in the path of light from said reflector means to said observer, said second refractor means having an incident face on which light from said reflector means is incident and an exit face from which light passing through said second refractor means is directed towards said observer through said viewing opening of said housing; and
      iv) an inclination of said incident face of said first refractor means to an longitudinal axis of said vehicle being less than 30°.

28. The optical rear view system of claim 27 wherein said first and second refractor means have rectangular faces with rounded corners.

29. The optical rear view system of claim 27 wherein said first and second retractor means are inclined to one another such that a plane defined by light rays incident on and refracted by said first refractor means is inclined to a plane defined by light rays incident on and refracted by said second refractor means.

30. The optical rear view system of claim 27, wherein an orientation of said reflector means is adjustable independently of said first and second refractor means.

31. The optical rear view system of claim 27 including a motor and a linkage between said motor and said reflector means for effecting adjustment to an orientation of said reflector means.

32. The optical rear view system of claim 27, wherein said housing includes a streamlined outer casing enclosing said viewing system of optical components.

33. The optical rear view system of claim 27, wherein said housing is one of formed from and mounted within one of a motor vehicle side panel and a motor vehicle side door and includes a viewing port within a passenger compartment of said vehicle for observation of a rear view by said observer.

34. The optical rear view system of claim 27, wherein said first and second refractor means are prisms having substantially planar faces and each prism is orientated such that its apex is located adjacent said reflector means.

35. The optical rear view system of claim 27, wherein at least one of said first and second refractor means is formed as a Fresnel refractor with at least one face comprising a plurality of elementary surface portions inclined to a general plane of a surface of said at least one face.

36. The optical rear view system of claim 35, wherein said elementary surface portions are formed on said exit face of said at least one of said first and second refractor means.

37. The optical rear view system of claim 35, wherein said elementary surface portions are formed on said incident face of said at least one of said first and second refractor means.

38. The optical rear view system of claim 35, wherein said at least one face of said Fresnel refractor is generally curved and each elementary surface portion thereof is flat and inclined at an angle with respect to a nominal plane tangential to said at least one face at a location of said respective elementary surface portion thereof.

39. The optical rear view system of claim 35, wherein said at least one face of said Fresnel refractor is substantially flat and said elementary surface portions are inclined to said general plane of said at least one face at successively greater angles across said at least one face from one side edge of said face to an other.

40. An optical rear view system for a motor vehicle, adapted to be mounted on the body of a vehicle so as to have a minimal lateral projection from the vehicle, said system comprising:
   a) a housing having an objective opening therein exteriorly of the vehicle body, through which light from an object to the rear of said vehicle can enter said system, and a viewing opening interiorly of said vehicle body through which light can exit said system towards an observer located at the driver's position within said vehicle,
   b) a viewing system of optical components within said housing, said viewing system comprising:
      i) reflector means for reflecting incident light thereon;
      ii) first refractor means for refracting light from said object towards said reflector means, said first refractor means being in the path of light from said object to the rear of said vehicle passing through said objective-opening towards said reflector means, said first retractor means having an incident face on which light from said object is incident and an exit face from which light passing through said first refractor means is directed towards said reflector means;
      iii) second refractor means for compensating for chromatic aberrations introduced into said viewing system by said first refractor means, said second refractor means being in the path of light from said reflector means to said observer, said second refractor means having an incident face on which light from said reflector means is incident and an exit thee from which light passing through said second refractor means is directed towards said observer through said viewing opening of said housing; and iv) a relationship between each Abbè value of said first and second refractor means and an angle between said incident and said exit faces thereof being such that a ratio between respective said angles and respective said Abbè numbers of said first and second retractor means lie within 0.4° of each other.

41. The optical rear view system of claim 40 wherein said first and second refractor means have rectangular faces with rounded corners.

42. The optical rear view system of claim 40 wherein said first and second refractor means are inclined to one another such that a plane defined by light rays incident on and refracted by said first refractor means is inclined to a plane defined by light rays incident on and refracted by said second refractor means.

43. The optical rear view system of claim 40, wherein an orientation of said reflector means is adjustable independently of said first and second refractor means.

44. The optical rear view system of claim 40 including a motor and a linkage between said motor and said reflector means for effecting adjustment to an orientation of said reflector means.

45. The optical rear view system of claim 40, wherein said housing includes a streamlined outer casing enclosing said viewing system of optical components.

46. The optical rear view system of claim 40, wherein said housing is one of formed from and mounted within one of a motor vehicle side panel and a motor vehicle side door and includes a viewing port within a passenger compartment of said vehicle for observation of a rear view by said observer.

47. The optical rear view system of claim 40, wherein said first and second refractor means are prisms having substantially planar faces and each prism is orientated such that its apex is located adjacent said reflector means.

48. The optical rear view system of claim 40, wherein at least one of said first and second refractor means is formed as a Fresnel refractor with at least one face comprising a plurality of elementary surface portions inclined to a general plane of a surface of said at least one face.

49. The optical rear view system of claim 48, wherein said elementary surface portions are formed on said exit face of said at least one of said first and second refractor means.

50. The optical rear view system of claim 48, wherein said elementary surface portions are formed on said incident face of said at least one of said first and second refractor means.

51. The optical rear view system of claim 48, wherein said at least one face of said Fresnel refractor is generally curved and each elementary surface portion thereof is flat and inclined at an angle with respect to a nominal plane tangential to said at least one face at a location of said respective elementary surface portion thereof.

52. The optical rear view system of claim 48, wherein said at least one face of said Fresnel refractor is substantially flat and said elementary surface portions are inclined to said general plane of said at least one face at successively greater angles across said at least one face from one side edge of said face to an other.

53. An optical rear view system for a motor vehicle, adapted to be mounted on the body of a vehicle so as to have a minimal lateral projection from the vehicle, said system comprising:

a) a housing having an objective opening therein exteriorly of the vehicle body, through which light from an object to the rear of said vehicle can enter said system, and a viewing opening interiorly of said vehicle body through which light can exit said system towards an observer located at the driver's position within said vehicle, b) a viewing system of optical components within said housing, said viewing system comprising:

i) reflector means for reflecting incident light thereon;

ii) first refractor means for retracting light from said object towards said reflector means, said first refractor means being in a path of light from said object to a rear of said vehicle passing through said objective opening towards said reflector means, said first refractor means having an incident face on which light from said object is incident and an exit face from which light passing through said first refractor means is directed towards said reflector means;

iii) second refractor means for compensating for chromatic aberrations introduced into said viewing system by said first refractor means, said second refractor means being in a path of light from said reflector means to said observer, said second refractor means having an incident face on which light from said reflector means is incident and an exit face from which light passing through said second refractor means is directed towards said observer through said viewing opening of said housing; and iv) an angle between said incident face of said first refractor means and a longitudinal axis of the vehicle is such that, for all light rays within a field of view, an angle between said exit face of said second retractor means and the path of the light to the observer is greater than said angle between said incident face of said first retractor means and said longitudinal axis of said vehicle.

54. The optical rear view system of claim 53 wherein said first and second refractor means have rectangular faces with rounded corners.

55. The optical rear view system of claim 53 wherein said first and second refractor means are inclined to one another such that a plane defined by light rays incident on and refracted by said first retractor means is inclined to a plane defined by light rays incident on and refracted by said second retractor means.

56. The optical rear view system of claim 53, wherein an orientation of said reflector means is adjustable independently of said first and second refractor means.

57. The optical rear view system of claim 53 including a motor and a linkage between said motor and said reflector means for effecting adjustment to an orientation of said reflector means.

58. The optical rear view system of claim 53, wherein said housing includes a streamlined outer casing enclosing said viewing system of optical components.

59. The optical rear view system of claim 53, wherein said housing is one of formed from and mounted within one of a motor vehicle side panel and a motor vehicle side door and includes a viewing port within a passenger compartment of said vehicle for observation of a rear view by said observer.

60. The optical rear view system of claim 53, wherein said first and second refractor means are prisms having substantially planar faces and each prism is orientated such that its apex is located adjacent said reflector means.

61. The optical rear view system of claim 53, wherein at least one of said first and second refractor means is formed as a Fresnel refractor with at least one face comprising a plurality of elementary surface portions inclined to a general plane of a surface of said at least one face.

62. The optical rear view system of claim 61, wherein said plurality of elementary surface portions are formed on said exit face of said at least one of said first and second refractor means.

63. The optical rear view system of claim 61, wherein said plurality of elementary surface portions are formed on said incident face of said at least one of said first and second refractor means.

64. The optical rear view system of claim 61, wherein said at least one face of said Fresnel retractor is generally curved and each elementary surface portion thereof is flat and inclined at an angle with respect to a nominal plane tangential to said at least one face at a location of said respective elementary surface portion thereof.

65. The optical rear view system of claim 61, wherein said at least one face of said Fresnel retractor is substantially flat and said elementary surface portions are inclined to said general plane of said at least one face at successively greater angles across said at least one face from one side edge of said face to an other.

66. An optical rear view system for a motor vehicle, said system having housing means for housing a viewing system of optical components, comprising:

reflector means for reflecting incident light thereon;

said reflector means being mounted in said housing means such that its inclination is adjustable with respect thereto;

first refractor means for refracting light from said object towards said reflector means, said first refractor means being between an object to the rear of said vehicle and said reflector means, said first refractor means having an incident face on which light from said object is incident and an exit face from which light passing through said first refractor means is directed towards said reflector means;

said first refractor means being shaped and positioned such that an optical path length of light within said first refractor means is shorter than an optical path length of light from said exit face to said reflector means within said housing; and second refractor means mounted in said housing means between said reflector means and an observer, said second refractor means having an incident face on which light from said reflector means is incident and an exit face from which light passing through said second refractor means is directed towards the observer.

67. The optical rear view system of claim 66, wherein said housing comprises one of a motor vehicle door and a motor vehicle side panel.

\* \* \* \* \*

UNITED STATES PATENT AND TRADEMARK OFFICE
CERTIFICATE OF CORRECTION

PATENT NO. : 5,594,593
DATED : January 14, 1997
INVENTOR(S) : Peter J. Milner

It is certified that error appears in the above-indentified patent and that said Letters Patent is hereby corrected as shown below:

Column 2, line 65, insert before line 65 the following:

--Figure 11 is a perspective view of the optical components of the embodiment of Figures 1 and 2--.

Column 8, line 53, change "front" to --from--.

Signed and Sealed this

Twelfth Day of August, 1997

Attest:

BRUCE LEHMAN

Attesting Officer

Commissioner of Patents and Trademarks